Patented Jan. 18, 1938

2,105,700

UNITED STATES PATENT OFFICE 2,105,700

PROCESS FOR PURIFICATION OF BEVERAGES

William D. Ramage, Berkeley, Calif.

No Drawing. Application July 13, 1936,
Serial No. 90,441

4 Claims. (Cl. 99—48)

This invention relates to a new process for the clarification of wine and other aqueous solutions and the removal of iron therefrom.

A part of the iron is removed from wines during the usual aging, clarification, and filtration processes. In some cases, however, it is very difficult to reduce the iron content low enough to avoid subsequent hazing or clouding. Multiple filtration at intervals of several weeks is sometimes used. In spite of this costly procedure, hazing may still occur and even the wine flavor may be adversely affected.

Sodium or potassium ferricyanide is often added to difficult wines to facilitate the iron removal. This procedure effects complete removal of the iron when carefully done, but is open to a serious objection from a health standpoint. Under the usual method of procedure, an excess of soluble ferricyanide is sometimes left in the wine and appreciable amounts of cyanide may result therefrom.

These and other disadvantages are eliminated by the use of the process which I have discovered. Since the iron removing agents which I use in practicing the process of my invention are all substantially insoluble materials, the possibility of leaving deleterious substances in the wine or other beverage is eliminated. In the specification and claims I have used the word "insoluble" in its conventional sense of "only slightly soluble".

The process involves the use of complex compounds which contain alkali or alkaline earth elements which are replaceable by iron and which are only very slightly soluble in water. The removal of the iron from the solution is substantially a base exchange operation. Materials suitable for treating wine must be not only insoluble in water but also substantially insoluble in dilute acid solutions. This greatly limits the number of compounds suitable for treating wine, since compounds which are unstable or soluble may change the wine flavor.

Ferrous ferricyanide and its related compounds always contain combined alkali metal or alkaline earth elements when precipitated from solutions containing these elements. Such alkali or alkaline earth elements are readily replaceable by iron, especially if the ferrous ferricyanide is precipitated in the presence of excess soluble ferricyanide and at no time exposed to a solution containing excess iron. Dispersion of ferrous ferricyanide in a wine, followed by filtration or settling, is, therefore, an effective means of removing iron from wine. The efficacy of the treatment depends to some extent upon the proportion of alkali and alkaline earth elements in the insoluble iron compound. This proportion may be increased by carrying out the precipitation of the ferrous ferricyanide in the presence of a considerable concentration of these elements. This indicates either the existence of a series of compounds or that a part of the alkali or alkaline earth metal is not in actual chemical combination, but merely occluded or adsorbed by the precipitated material.

Insoluble ferrocyanides may also be used, but they are not as satisfactory as the ferricyanides. In the specification and claims the word ferricyanide is to be understood as meaning compounds of this general type, including the ferrocyanides.

As already indicated, other base exchange compounds can be used, for example zeolites. I have found, however, that the ordinary zeolites are somewhat attacked at the wine acidity. In some cases the only effect is a decrease in the base exchange value of the zeolite, whereas in other cases actual disintegration of the zeolite occurs, which causes a noticeable change in the wine flavor. This is largely due to the increase in the concentration of soluble salts.

I prepared and used certain high silica, acid resistant zeolites and found that they did not disintegrate. However, they had a somewhat lower iron removing capacity (base exchange value) but not enough lower to impair their practical value for the process. At acidities greater than normal wine acidities, I found that the base exchange values of the zeolites for iron decreased rapidly. On the other hand, the base exchange values of the ferrous ferricyanides remained high even in quite acid solutions.

I have also used various other combinations of which the following examples are typical:

The ferrous ferricyanide was precipitated on numerous base materials to increase the ease of subsequent clarification. Among those which I have used are iron oxide gel, silica gel, activated carbon, and cellulose. The use of the last named substance involves certain novel features which will be covered in a separate application.

In addition to the acid resistant zeolites mentioned above, I have also found it feasible to use ordinary zeolites when properly protected. It is convenient to accomplish this protection by first treating the zeolite with an iron solution and then with a ferricyanide solution. This gives an adherent coating of insoluble ferricyanide on the surface of the zeolite particles, which partially inhibits the disintegrating action of the wine acids.

Alkaline earth silicates and phosphates have also been used with good results. However, for wine treatment these have not been found as satisfactory as the materials described above. In general, they are best adapted to somewhat less acid solutions.

Good results were obtained with a special acid resistant calcium silicate. The material was prepared by addition of an excess of a calcium chloride solution containing free acid to a high silica sodium silicate solution.

In carrying out my process, the finely divided treating material was dispersed in the solution treated, the mixture agitated to secure good contact, and the treating material was then filtered, centrifuged or allowed to settle, either with or without the use of inert filter aids. In most cases I used the centrifuge which is ideally adapted to remove the finely divided treating material. It is apparent, however, that the materials may be used in the form of a bed, through which the wine or other solution is allowed to percolate. Beds may also be formed wherein the active treating material is mixed with inert filter aids, or alternate layers of filtering materials and iron removing agents may be employed.

Any of the above materials is capable of reducing the iron content of a solution below 4 parts per million if the acidity of the solution is not greater than pH 4.0. If the acidity of the beverage to be treated is greater than pH 3.5, the more acid resistant treating agents should be used. I have reduced the iron content of even the most acid wine below 4 parts per million using ferrous ferricyanide as the treating agent.

The form of material is not limited to those described above. Suitable materials have been prepared by numerous other methods. For example, a granular ferrous ferricyanide was prepared by an extension of the method used for protecting zeolites against the wine acids. A granular ferricyanide was also prepared by digestion of a calcined ferrous silicate gel in a sodium ferricyanide solution containing free acid.

My process is applicable for the treatment of wines, beers, ciders, and other fermented beverages and similar solutions, and I have used the term "fermented beverages" to include all of the foregoing.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects, which may be found useful in many other applications thereof.

I claim:

1. A process of treating fermented beverages which comprises contacting the beverage with an insoluble ferricyanide compound which contains an element replaceable by iron.

2. A process for treating fermented beverages which comprises contacting the beverage with a filtering aid on which an insoluble ferricyanide compound is precipitated.

3. A process of treating fermented beverages which comprises contacting the beverage with a base material containing adsorbed insoluble ferricyanides.

4. A process of treating fermented beverages which comprises contacting the beverage with a zeolite containing adsorbed insoluble ferricyanides.

WILLIAM D. RAMAGE.